United States Patent
Fan et al.

(10) Patent No.: US 12,465,939 B2
(45) Date of Patent: Nov. 11, 2025

(54) COLOR CHANGE BLOCK WITH DETECTION FEEDBACK AS WELL AS SPRAYING EQUIPMENT

(71) Applicant: ShanDong JiaoTong University, Jinan (CN)

(72) Inventors: Yong Fan, Jinan (CN); Fuguang Yang, Jinan (CN); Jiuhong Ruan, Jinan (CN); Guodong Li, Jinan (CN)

(73) Assignee: ShanDong JiaoTong University, Jinan (CN)

( * ) Notice: Subject to any disclaimer, the term of this patent is extended or adjusted under 35 U.S.C. 154(b) by 728 days.

(21) Appl. No.: 17/932,513

(22) Filed: Sep. 15, 2022

(65) Prior Publication Data

US 2023/0241635 A1 Aug. 3, 2023

(30) Foreign Application Priority Data

Jan. 28, 2022 (CN) .......................... 202210106367.6

(51) Int. Cl.
*B05B 12/14* (2006.01)
*B05B 12/00* (2018.01)
*B05B 15/55* (2018.01)

(52) U.S. Cl.
CPC .......... *B05B 12/149* (2013.01); *B05B 12/004* (2013.01); *B05B 15/55* (2018.02)

(58) Field of Classification Search
None
See application file for complete search history.

(56) References Cited

U.S. PATENT DOCUMENTS

| 2010/0193601 A1* | 8/2010 | Nabeshima ............... B08B 9/00 239/104 |
| 2015/0314246 A1* | 11/2015 | Lehtonen ............ B01F 35/2206 700/265 |
| 2017/0197852 A1* | 7/2017 | Yoshida .................... C02F 1/56 |
| 2017/0360069 A1* | 12/2017 | Concin .................... A23B 2/20 |

* cited by examiner

*Primary Examiner* — Kelsey E Cary
(74) *Attorney, Agent, or Firm* — Patshegen IP; Moshe Pinchas

(57) ABSTRACT

The present disclosure belongs to the technical field of mechanical spraying, and a color change block with detection feedback as well as spraying equipment are provided. The color change block with detection feedback comprises a cleaning agent valve module, a color change micro valve module, a mixing pipe module and a turbidity detection module which are connected in sequence. A complete collinear common channel is formed among these modules, and the wall surface of the common channel is a complete plane. The turbidity detection module is further connected to the control module and used for monitoring the turbidity of a medium flowing through the common channel in real time so as to determine whether the medium in the common channel meets a cleaning requirement or not and feed a determination result back to the control module, and then the control module switches other media to form a closed-loop control.

18 Claims, 4 Drawing Sheets

COLOR CHANGE BLOCK WITH DETECTION FEEDBACK AS WELL AS SPRAYING EQUIPMENT

CROSS REFERENCE TO RELATED APPLICATION

This patent application claims the benefit and priority of Chinese Patent Application No. 202210106367.6, filed on Jan. 28, 2022, the disclosure of which is incorporated by reference herein in its entirety as part of the present application.

TECHNICAL FIELD

The present disclosure belongs to the technical field of mechanical spraying, and in particular relates to a color change block with detection feedback, as well as spraying equipment.

BACKGROUND ART

The statements in this section merely provide background technical information related to the present disclosure and do not necessarily constitute prior art.

Along with the diversification of people's demand for products, the mixed fluidization degree of multi-model and multi-color spraying of a single production line is increasing, and the time for color change and cleaning of the robot needs to be reduced as much as possible within a certain production takt. In order to guarantee the quality of spraying, the requirements for color change and cleaning of the robot are getting higher and higher.

The inventor discovered that the color change time of an existing color change block is still long, it is unable to perform the detection feedback of residual paint in a channel after color change and cleaning, and cannot effectively perform closed-loop control in real time.

SUMMARY

In order to solve the technical problem of defects in color change time and color change efficiency at present in the background art above, the present disclosure provides a color change block with detection feedback as well as spraying equipment. The integrated design of color change and mixing is carried out on the basis of a traditional color change valve, a paint channel is optimized, and a paint detection feedback sensor is added, such that the color change time may be remarkably shortened, and a closed-loop control for color change detection is formed.

To achieve the above objective, the present disclosure employs the following technical solutions:

In accordance with a first aspect of the present disclosure, a color change block with detection feedback is provided, which comprises a cleaning agent valve module, a color change micro valve module, a mixing pipe module and a turbidity detection module which are connected in sequence; a complete collinear common channel is formed among these modules, and the wall surface of the common channel is a complete plane.

The turbidity detection module is further connected to the control module and used for monitoring the turbidity of a medium flowing through the common channel in real time, thus determining whether a medium in the common channel meets a cleaning requirement or not and feeding a determination result to the control module, and the control module switches other media to form a closed-loop control.

As an embodiment, the cleaning agent valve module comprises a cleaning agent valve, a color change valve head plate, a cleaning agent valve connector, and a cleaning agent valve pneumatic connector; the cleaning agent valve is installed on the color change valve head plate, and the cleaning agent valve connector and cleaning agent valve pneumatic connector are installed on cleaning agent valve.

As an embodiment, the color change micro valve module comprises a color change micro valve block, a color change micro valve, a color change valve pneumatic connector, a feeding pipe connector and a discharging pipe connector; the color change micro valve block is provided with an air channel and a material channel, the color change micro valve is installed at the bottom of the color change micro valve block, and the color change valve pneumatic connector is installed on the color change micro valve air channel; and the feeding pipe connector and the discharging pipe connector are respectively installed on the material channel of the color change micro valve block.

As an embodiment, at least two color change micro valves are simultaneously installed on one color change micro valve block.

As an embodiment, the medium circulating in the color change micro valve comprises compressed air, paints, and curing agents.

As an embodiment, the mixing pipe module comprises a mixing pipe which is installed at the back face of a color change valve tail plate module, and the color change valve tail plate module is endmost one of a plurality of color change micro valve modules connected in series.

As an embodiment, a turbidity detection module channel is directly connected to a mixing pipe channel.

As an embodiment, the turbidity detection module comprises a turbidity detection sensor, a sensor installing support, and a pipeline connector; the turbidity detection sensor is installed on the sensor installing support, and the pipeline connector communicates with the turbidity detection sensor.

As an embodiment, the cleaning agent valve module, the color change micro valve module, the mixing pipe module and the turbidity detection module are sequentially connected in series by fixing bolts.

In accordance with a second aspect of the present disclosure, spraying equipment is provided, which comprises the above color change block with detection feedback.

Compared with the prior art, the present disclosure has the beneficial effects:

(1) An inner channel of the color change valve block is a complete plane, after the micro valve is closed, the wall face of the common channel is a complete plane, which has no branch holes and dead angles, convenient for cleaning, and has no residues. The color change valve bank channel, the mixing pipe and the turbidity detection sensor channel are collinear to form a complete channel, thus the circulation of the medium is free of resistance. The cleaning agent valve is installed at the front end of the valve bank, and an outlet of the cleaning agent valve directly communicates with a paint common channel, thus the cleaning agent may quickly enter the common channel for cleaning.

(2) The color change valve bank is integrally designed, which is compact in structure and convenient to install. The components are connected in series by fixing bolts to facilitate the addition and reduction of the module.

(3) The turbidity detection sensor is added behind the mixing pipe, which may detect whether there is residual paint in the channel or not in real time and form a closed-loop control to prevent the occurrence of color mixing during spraying.

Advantages of additional aspects of the present disclosure will be set forth in part in the description which follows, and in part will be obvious from the description, or learned by practice of the present disclosure.

BRIEF DESCRIPTION OF THE DRAWINGS

The accompanying drawings of the specification constituting part of the present disclosure are used to provide a further understanding of the present disclosure, and the schematic embodiments of the present disclosure and their descriptions are used to explain the present disclosure and do not constitute an undue limitation of the present disclosure.

Figure 1:
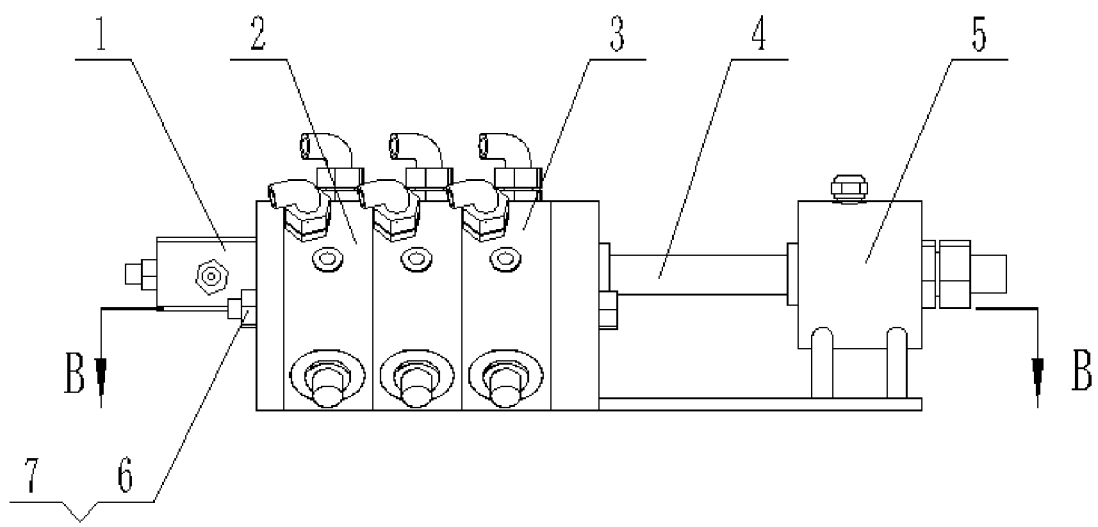
FIG. 1 is a constitutional diagram of a color change block with detection feedback in accordance with an embodiment of the present disclosure.

In the drawings: 1—cleaning agent valve module; 2—color change micro valve module; 3—color change valve tail plate module; 4—mixing pipe module; 5—turbidity detection module; 6—connecting bolt; 7—connecting nut; 101—cleaning agent valve; 102—color change valve head plate; 103—cleaning agent inlet valve connector; 104—cleaning agent valve pneumatic connector; 105—cleaning agent inlet valve connector; 201—color change micro valve block; 202—color change micro valve; 203—color change valve pneumatic connector; 204—feeding pipe connector; 205—discharging pipe connector; 401—mixing pipe; 501—turbidity sensor; 502—pipeline connector.

DETAILED DESCRIPTION OF THE EMBODIMENTS

The present disclosure is further described below with reference to the accompanying drawings and embodiments.

It should be noted that the following detailed description is exemplary and is intended to provide a further description of the present disclosure. Unless otherwise specified, all technical and scientific terms used herein have the same meaning as commonly understood by those of ordinary skill in the art to which the present disclosure belongs.

It needs to be noted that the terminology used here is for the purpose of describing particular embodiments only and is not intended to limit exemplary embodiments based on the present disclosure. As used here, unless the context clearly indicates otherwise, the singular form is also intended to include the plural form. In addition, it is further understood that when the terms "comprising" and/or "including" are used in this specification, they indicate the presence of features, steps, operations, devices, components, and/or combinations thereof.

Embodiment I

Figure 5A:
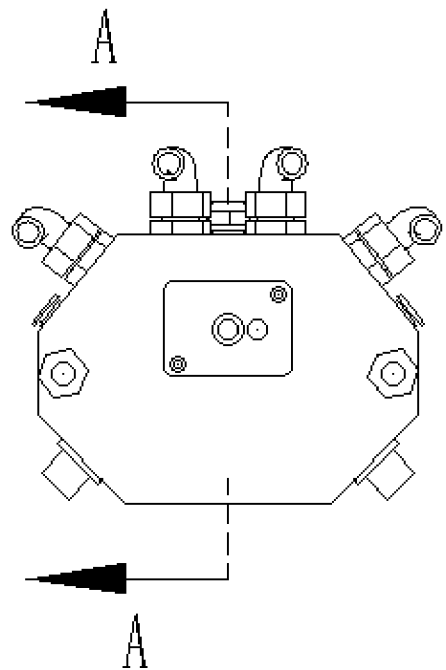
FIG. 5A is an AA common channel in a color change block with detection feedback in accordance with an embodiment of the present disclosure.
Figure 5B:
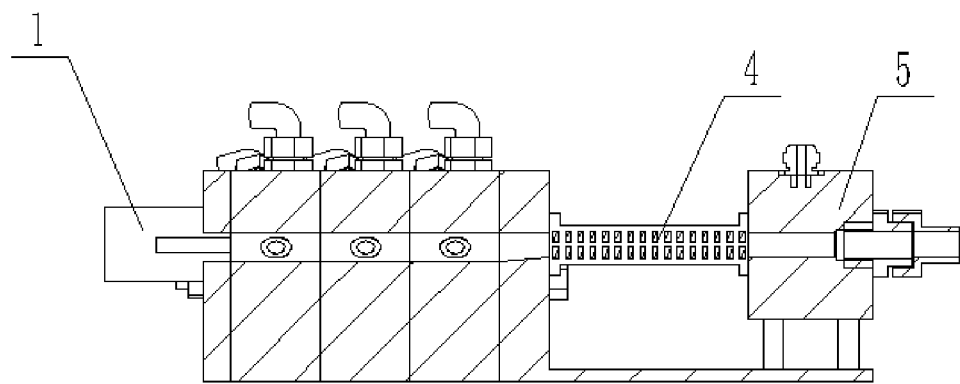
FIG. 5B is a sectional view of a common channel in a color change block with detection feedback in accordance with an embodiment of the present disclosure.

Refer to FIG. 1, this embodiment provides a color change block with detection feedback, which comprises a cleaning agent valve module 1, a color change micro valve module 2, a mixing pipe module 4, and a turbidity detection module 5 which are connected in sequence. A complete and collinear common channel is formed among these modules, and the wall surface of the common channel is a complete plane, as shown in FIG. 5A and FIG. 5B.

Therefore, there are no branch holes and dead angles, and the circulation of medium is free of resistance. The cleaning agent valve module is at the front end of the color change block, and the cleaning agent valve module directly communicates with the common channel.

Figure 6:
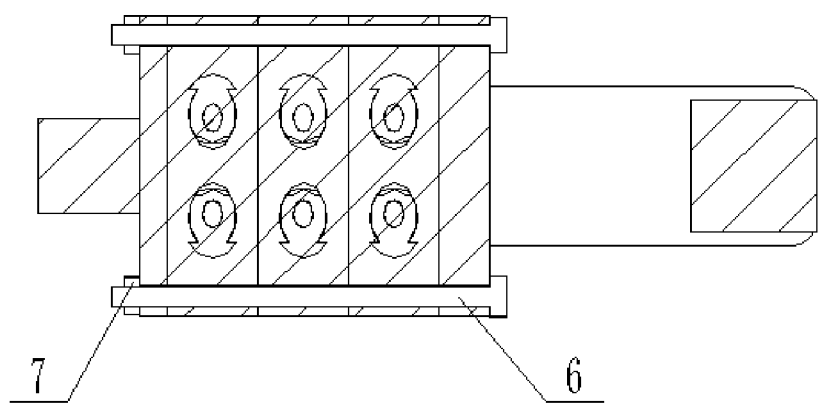
FIG. 6 is a diagram illustrating connection fixation between components in a color change block with detection feedback in accordance with an embodiment of the present invention.

In this embodiment, the cleaning agent valve module 1, the color change micro valve module 2, the mixing pipe module 4, and the turbidity detection module 5 are sequentially connected in series by fixing bolts, as shown in FIG. 6. In FIG. 6, the fixing bolt consists of a connecting bolt 6 and a connecting nut 7.

The turbidity detection module 5 is further connected to the control module, the turbidity detection module 5 is used for monitoring the turbidity of a medium flowing through the common channel in real time, thus determining whether the medium in the common channel meets a cleaning requirement or not and feeding a determination result back to the control module, and the control module switches other media to form a closed-loop control.

In this embodiment, the color change block with detection feedback comprises a plurality of a plurality of color change micro valve modules 2 connected in series. The endmost color change micro valve module 2 is a color change valve tail plate module 3.

Figure 2:
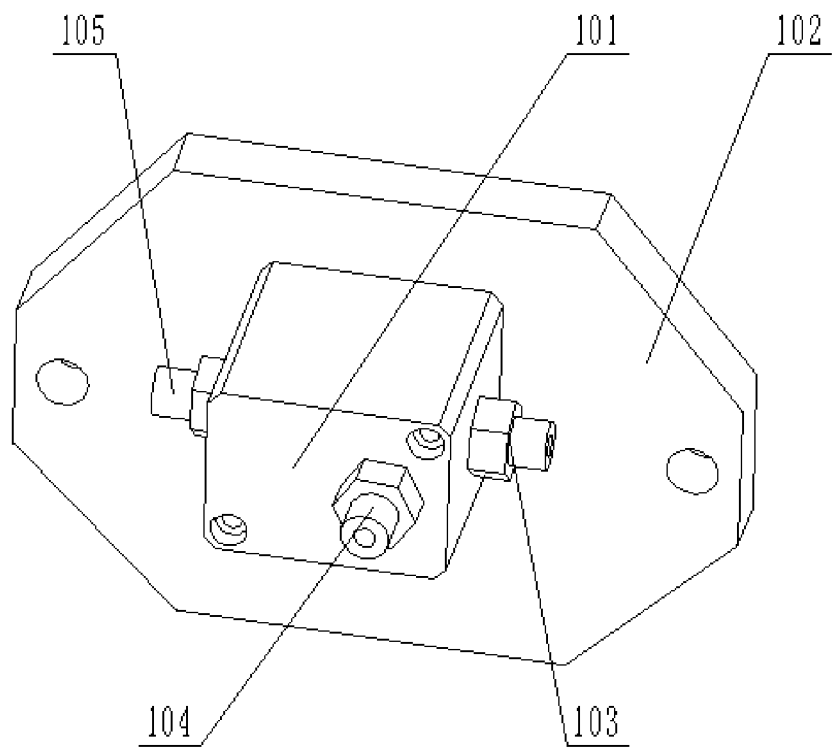
FIG. 2 is a constitutional diagram of a cleaning agent valve module in a color change block with detection feedback in accordance with an embodiment of the present disclosure.

During specific implementation, as shown in FIG. 2, the cleaning agent valve module 1 comprises a cleaning agent valve 101, a color change valve head plate 102, a cleaning agent valve connector 103, and a cleaning agent valve pneumatic connector 104. The cleaning agent valve 101 is installed on the color change valve head plate 102, and the cleaning agent valve connector 103 and the cleaning agent valve pneumatic connector 104 are installed on the cleaning agent valve 101. The other end communicating with the cleaning agent valve connector 103 is further provided with a cleaning agent inlet valve connector 105. The cleaning agent inlet valve connector 105 directly communicates with the color change micro valve module 2.

For example, the cleaning agent valve 101 is installed on the color change valve head plate by a bolt.

It may be understood that, in other embodiments, the cleaning agent valve 101 may also be installed on the color change valve head plate 102 by other fixing modes such as clamping.

Figure 3:
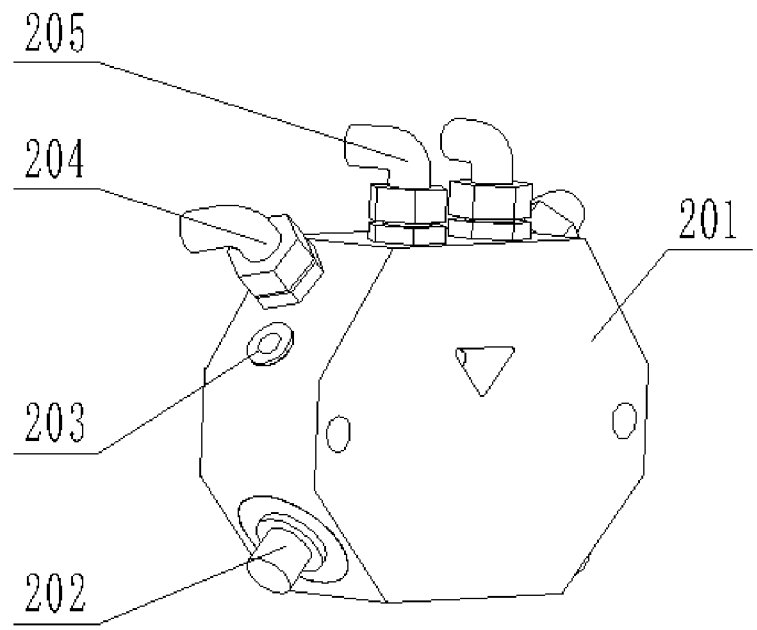
FIG. 3 is a constitutional diagram of a color change micro valve module in a color change block with detection feedback in accordance with an embodiment of the present disclosure.

During specific implementation, as shown in FIG. 3, the color change micro valve module 2 comprises a color change micro valve block 201, a color change micro-vale 202, a color change valve pneumatic connector 203, a feeding pipe connector 204 and a discharging pipe connector 205. The color change micro valve block 201 is provided with an air channel and a material channel. The color change micro valve 202 is installed at the bottom of the color change micro valve block 201, the color change valve pneumatic connector 203 is installed on the air channel of the color change micro valve 202, and the feeding pipe connector 204 and the discharging pipe connector 205 are respectively installed on the material channel of the color change micro valve block 201.

In accordance with one or more embodiments, at least two color change micro valves 202 are simultaneously installed on one color change micro valve block 201. The number of the color change micro valves 202 installed on the color change micro valve block 201 may be specifically set by those skilled in the art according to the actual situation. As such, no further details will be given here.

Specifically, the medium circulating in the color change micro valve 202 comprises compressed air, paints, and curing agents.

Figure 4:
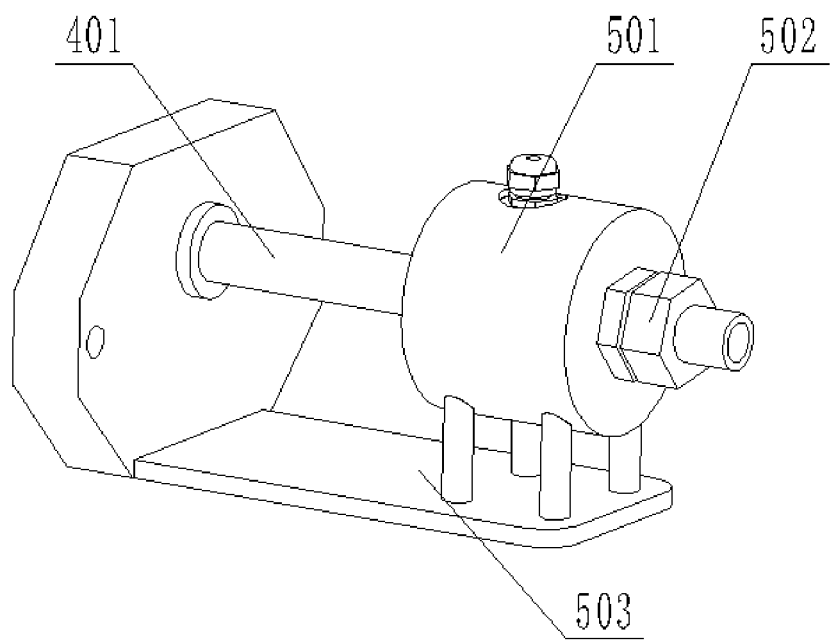
FIG. 4 is a constitutional diagram of a mixing pipe module and a turbidity detection module in a color change block with detection feedback in accordance with an embodiment of the present disclosure.

During specific implementation, as shown in FIG. 4, the mixing pipe module 4 comprises a mixing pipe 401 which is installed on the back face of the color change valve tail plate module 3.

During specific implementation, the turbidity detection module 5 channel is directly connected to the mixing pipe 401 channel.

Specifically, the turbidity detection module 5 comprises a turbidity detection sensor 501, a sensor installing support, and a pipeline connector 502. The turbidity detection sensor 501 is installed on the sensor installing support, and the pipeline connector 502 communicates with the turbidity detection sensor 501.

It needs to be noted here that in the turbidity detection module 5, the turbidity detection sensor 501 may be replaced with a spectrum detection sensor.

In this embodiment, the rear end of the color change block is provided with the turbidity sensor which may monitor the medium flowing through the channel in real time, may monitor whether the coating in the channel is completely cleaned or not, and may feed a signal back to the control system to form a closed-loop control.

In this embodiment, the defects in color change time and color change efficiency at present are overcome, the integrated design color change and mixing is carried out on the basis of a traditional color change valve, a paint channel is optimized, and a paint detection feedback sensor (such as the turbidity detection sensor) is additionally arranged, such that the color change time is remarkably shortened, and color change detection closed-loop control is formed.

Embodiment II

This embodiment provides spraying equipment, which comprises the color change block with detection feedback above.

It needs to be noted here that the spraying equipment may be a robot or other equipment on which the color change block with the detection feedback may be installed. In addition to the color change block with detection feedback as above, other structures of the spraying equipment may be implemented by employing existing structures. As such, no further details will be given here.

The above are only preferred embodiments of the present disclosure and are not intended to limit the present disclosure, and for those skilled in the art, the present disclosure may have various modifications and variations. Any modifications, equivalent substitutions, improvements and the like made within the principle of the present disclosure should fall within the scope of protection of the present disclosure.

What is claimed is:

1. A color change block with detection feedback, comprising a cleaning agent valve module, a color change micro valve module, a mixing pipe module and a turbidity detection module which are connected in sequence; a complete collinear common channel is formed among these modules, and the wall surface of the common channel is a complete plane;

the turbidity detection module is further connected to a control module and used for monitoring the turbidity of a medium flowing through the common channel in real time, thus determining whether a medium in the common channel meets a cleaning requirement or not and feeding a determination result to the control module, and the control module switches other media to form a closed-loop control.

2. The color change block with detection feedback according to claim 1, wherein the cleaning agent valve module comprises a cleaning agent valve, a color change valve head plate, a cleaning agent valve connector, and a cleaning agent valve pneumatic connector;

the cleaning agent valve is installed on the color change valve head plate, and the cleaning agent valve connector and cleaning agent valve pneumatic connector are installed on cleaning agent valve.

3. The color change block with detection feedback according to claim 1, wherein the color change micro valve module comprises a color change micro valve block, a color change micro valve, a color change valve pneumatic connector, a feeding pipe connector and a discharging pipe connector; the color change micro valve block is provided with an air channel and a material channel, the color change micro valve is installed at the bottom of the color change micro valve block, and the color change valve pneumatic connector is installed on the color change micro valve air channel; and the feeding pipe connector and the discharging pipe connector are respectively installed on the material channel of the color change micro valve block.

4. The color change block with detection feedback according to claim 3, wherein at least two color change micro valves are simultaneously installed on one color change micro valve block.

5. The color change block with detection feedback according to claim 3, wherein the medium circulating in the color change micro valve comprises compressed air, paints, and curing agents.

6. The color change block with detection feedback according to claim 1, wherein the mixing pipe module comprises a mixing pipe which is installed at the back face of a color change valve tail plate module, and the color change valve tail plate module is endmost one of a plurality of color change micro valve modules connected in series.

7. The color change block with detection feedback according to claim 6, wherein a turbidity detection module channel is directly connected to a mixing pipe channel.

8. The color change block with detection feedback according to claim 1, wherein the turbidity detection module comprises a turbidity detection sensor, a sensor installing support, and a pipeline connector; the turbidity detection sensor is installed on the sensor installing support, and the pipeline connector communicates with the turbidity detection sensor.

9. The color change block with detection feedback according to claim 1, wherein the cleaning agent valve module, the color change micro valve module, the mixing pipe module and the turbidity detection module are sequentially connected in series by fixing bolts.

10. Spraying equipment, comprising the color change block with detection feedback according to claim 1.

11. The spraying equipment according to claim 10, wherein the cleaning agent valve module comprises a cleaning agent valve, a color change valve head plate, a cleaning agent valve connector, and a cleaning agent valve pneumatic connector; the cleaning agent valve is installed on the color change valve head plate, and the cleaning agent valve connector and cleaning agent valve pneumatic connector are installed on cleaning agent valve.

12. The spraying equipment according to claim 10, wherein the color change micro valve module comprises a color change micro valve block, a color change micro valve, a color change valve pneumatic connector, a feeding pipe connector and a discharging pipe connector; the color change micro valve block is provided with an air channel and a material channel, the color change micro valve is installed at the bottom of the color change micro valve block, and the color change valve pneumatic connector is installed on the color change micro valve air channel; and the feeding pipe connector and the discharging pipe connector are respectively installed on the material channel of the color change micro valve block.

13. The spraying equipment according to claim 12, wherein at least two color change micro valves are simultaneously installed on one color change micro valve block.

14. The spraying equipment according to claim 12, wherein the medium circulating in the color change micro valve comprises compressed air, paints, and curing agents.

15. The spraying equipment according to claim 10, wherein the mixing pipe module comprises a mixing pipe which is installed at the back face of a color change valve tail plate module, and the color change valve tail plate module is endmost one of a plurality of color change micro valve modules connected in series.

16. The spraying equipment according to claim 15, wherein a turbidity detection module channel is directly connected to a mixing pipe channel.

17. The spraying equipment according to claim 10, wherein the turbidity detection module comprises a turbidity detection sensor, a sensor installing support, and a pipeline connector; the turbidity detection sensor is installed on the sensor installing support, and the pipeline connector communicates with the turbidity detection sensor.

18. The spraying equipment according to claim 10, wherein the cleaning agent valve module, the color change micro valve module, the mixing pipe module and the turbidity detection module are sequentially connected in series by fixing bolts.

* * * * *